United States Patent [19]
Sugiura et al.

[11] 3,921,778
[45] Nov. 25, 1975

[54] VEHICLE WET-TYPE FRICTION CLUTCH

[75] Inventors: Teruo Sugiura, Toyota; Yujiro Takikawa, Nagoya; Hiroshi Miyamoto, Toyota; Nobuyasu Ishida, Tokai, all of Japan

[73] Assignee: Aisin Seiki Kabushiki Kaisha, Japan

[22] Filed: Jan. 30, 1974

[21] Appl. No.: 438,015

[30] Foreign Application Priority Data
Feb. 24, 1973  Japan.......................... 48-23826[U]

[52] U.S. Cl............................................. 192/113 B
[51] Int. Cl.².......................................... F16D 13/72
[58] Field of Search ................................ 192/113 B

[56] References Cited
UNITED STATES PATENTS

| | | | |
|---|---|---|---|
| 2,158,440 | 5/1939 | Spase | 192/113 B |
| 3,474,888 | 10/1969 | Carlson et al. | 192/113 B |
| 3,540,557 | 4/1969 | Hasselbacher | 192/113 B X |
| 3,610,384 | 10/1971 | Borck | 192/113 B |
| 3,672,478 | 6/1972 | Reise et al. | 192/113 B X |

FOREIGN PATENTS OR APPLICATIONS
975,377  11/1961  Germany.......................... 192/113 B

*Primary Examiner*—Benjamin W. Wyche
*Attorney, Agent, or Firm*—Pierce, Scheffler & Parker

[57] ABSTRACT

The invention relates to a vehicle wet-type friction clutch including a torque transmitting shaft, a clutch disc assembly being axially slidably mounted on the shaft through a spline coupling formed thereon, a release bearing having a bearing hub for releasing torque transmitted to the torque transmitting shaft according to the clutch releasing operation, a bearing retainer for retaining said bearing hub, and an oil passage means being axially mounted on the bearing retainer for applying cool oil to the clutch disc assembly.

3 Claims, 3 Drawing Figures

VEHICLE WET-TYPE FRICTION CLUTCH

BACKGROUND OF THE INVENTION

1. Field of the Invention

The present invention relates generally to a wet-type friction clutch for vehicles, and more particularly to an improved wet-type friction clutch with an oil spray system.

2. Description of the Prior Art

Various types of wet-type friction clutch of oil spray are of course known. However, there is the disadvantage in conventional wet-type friction clutches having oil spray system that cooling oil is not sprayed onto the frictional surfaces of clutch disc assembly, for the cooling oil is sprayed from the outside of a clutch cover via a diaphragm spring or a clutch release lever and thus the quantity of the cooling oil supplied to the frictional surfaces of clutch disc assembly is insufficient for cooling.

In such systems where an oil passage is formed within an output shaft and the cooling oil is supplied to the frictional surfaces of the clutch disc assembly through the oil passage in the output shaft, the strength of the output shaft is decreased.

Further in a conventional system having an annular oil passage provided between the output shaft and a bearing retainer, a great deal of oil flows through the annular oil passage, however, the pressure applied to the oil is not sufficient for the large oil passage. Accordingly, insufficient cooling oil is supplied to the clutch disc assembly, so that a little cooling oil is supplied to the frictional surfaces of the clutch disc assembly by the centrifugal force on the oil due to the rotation of the clutch disc assembly. In consequence, the cooling effect on the contacting surfaces of clutch facing element of clutch disc assembly is minimal. Even if enough pressure is applied to the oil, the pressure on the oil is axially directed in the depressing direction of the clutch disc assembly. Therefore, the clutch disc assembly is not fully released from a fly wheel or an intermediate plate, even upon axial movement of a pressure plate in its clutch releasing direction, resulting in a substantial retardation in the clutch releasing movement of the clutch disc assembly, and thus the engagement of the clutch facing element with the flywheel is not entirely released resulting in entrained rotation of the assembly.

SUMMARY OF THE INVENTION

It is, therefore, an object of the present invention to provide an improved wet-type friction clutch having an oil spray system adapted for obviating the aforementioned drawbacks of conventional wet-type friction clutches having oil spray.

It is another object of the present invention to provide an improved wet-type friction clutch having an oil spray system for directly providing cool oil to contacting surfaces of clutch facing elements of the clutch disc assembly by utilizing the centrifugal force resulting from the rotation of the clutch disc assembly.

It is still another object of the present invention to provide an improved wet-type friction clutch having an oil spray system capable of providing constant cooling oil regardless of the releasing movement of the clutch disc assembly.

It is a further object of the present invention to provide a unique and highly simplified wet-type friction clutch having an oil spray system.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE ILLUSTRATED EMBODIMENTS

Figure 1:
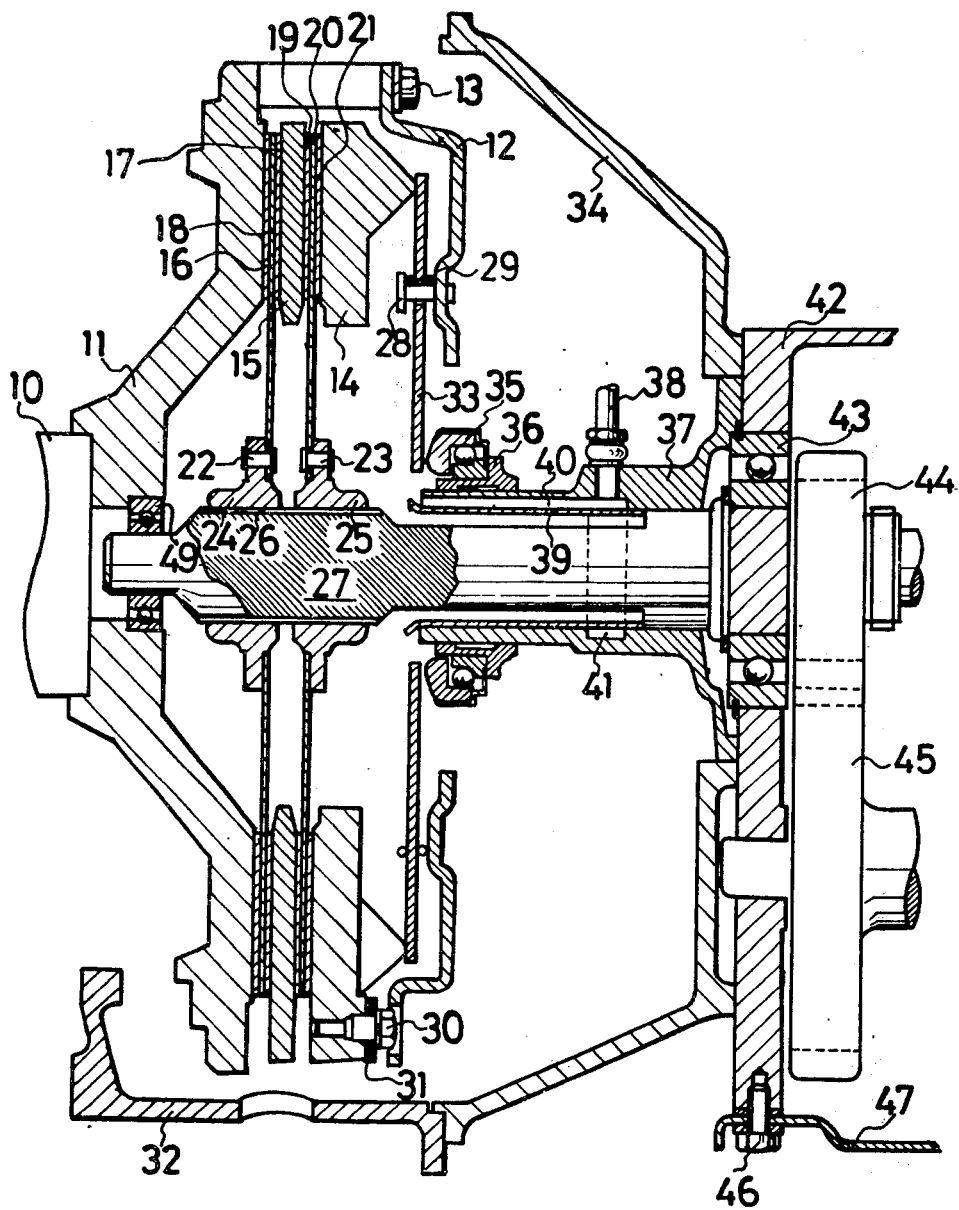
FIG. 1 is a sectional view of the wet-type friction clutch constructed according to the present invention.
Figure 2:
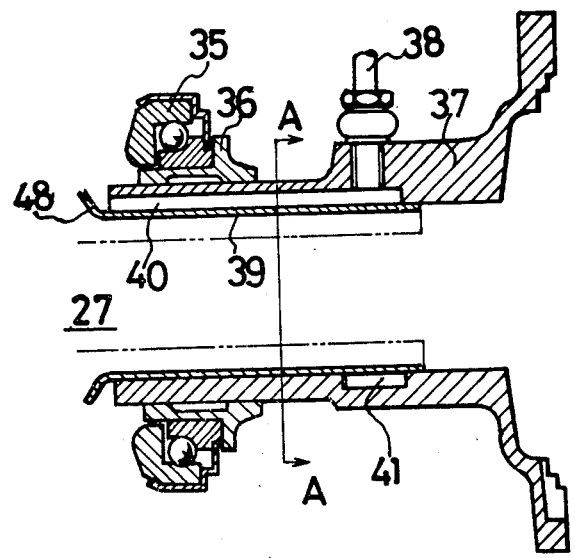
FIG. 2 is an enlarged sectional view of the oil spray member of the invention shown in FIG. 1.

In FIG. 1, the numeral 10 represents only partially a crankshaft of an internal combustion engine, not shown, fitted on an automotive vehicle, again not shown. A flywheel 11 is concentrically and fixedly attached to the crankshaft 10 by means of a plurality of fixing bolts, not shown. A conventional cover plate 12 is attached concentrically and fixedly to the flywheel 11 by means of a plurality of fixing bolts of which only one is shown representatively at 13. An intermediate plate 15 is inserted between the flywheel 11 and a pressure plate 14. The outer peripheral end portion of the intermediate plate 15 is slidably inserted into a recess, not shown, provided on the flywheel 11 and the rotation of the engine is transmitted to the intermediate plate 15 through the flywheel 11. Numeral 16 represents a conventional disc facing member provided at the flywheel side; and numeral 17 represents a similar member provided at the pressure plate side. A disc plate 18 between the disc facing members 16, 17 is fixedly attached to a clutch hub 24 by means of a plurality of hub rivets of which only one is shown representatively at 22. Numeral 19 represents a conventional disc facing member provided at the flywheel side; and numeral 21 represents a similar member provided at the pressure plate side. A disc plate 20 between the disc facing members 19, 21 is fixedly attached to a clutch hub 25 by means of a plurality of hub rivets of which only one is shown representatively at 23.

The clutch hubs 24, 25 are axially slidably mounted on an output shaft 27 through a spline coupling shown at 26 formed thereon. The left-hand end of the output shaft 27 is concentrically and rotatably mounted in the right-hand end of the crankshaft 10 through a pilot bearing 49. Numeral 33 generally represents a diaphragm spring mounted on the cover plate 12 by means of a plurality of rivet members of which only one shown representatively at 28; this diaphragm spring exerts an axial pressure upon the pressure plate 14 in its actuating direction. Pivot rings 29 formed into large wire rings are inserted, as shown, one of pivot rings 29 being between the rivet member 28 and the diaphragm spring 33, and the other pivot ring 29 between the diaphragm spring 33 and the cover plate 12. A strap plate 31 is fixedly attached to the pressure plate 14 by means of a bolt 30.

Figure 3:
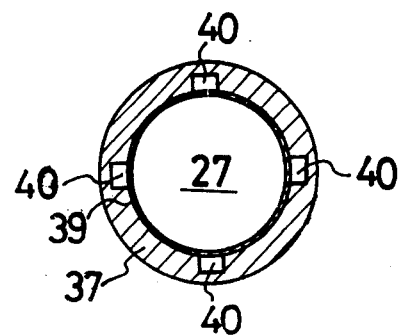
FIG. 3 is a view similar to FIG. 2 taken along the line A—A of FIG. 2.

Numeral 37 is a bearing retainer fixedly attached to a transmission case 42 by means of a plurality of nut members, not shown. A release bearing 35 having a bearing hub 36 is supported by the bearing retainer 37 and a sleeve 39 is inserted within the inner periphery of the bearing retainer 37. A plurality of oil passages 40 are axially formed within the bearing retainer 37 and four oil passages 40 may be provided circumferentially of the retainer as best seen in FIG. 3. The oil passages 40 — are fluidly connected with an annular groove 41 which is formed on the inner periphery of the bearing retainer 37 and is fluidly connected with a conduit 38 for supplying the cooling oil. A guide portion 48 extends radially, circumferentially and inclinedly at the extended guide portion 48 is provided on the open end of the sleeve 39 whereby the cooling oil can be sprayed from the oil passages 40 and toward the contacting surfaces of the disc facing members 16, 17, 19 and 21 by utilizing the centrifugal force acting on the oil due to the rotation of the clutch disc assembly, namely, the disc facing members 16, 17, 19 and 21, the clutch hubs 24, 25 etc.

A flywheel housing 32, a clutch housing 34 and the transmission case 42 are fixedly attached together by means of a plurality of nut members, not shown. An oil pan 47 is fixedly mounted on the transmission case 42 by means of a plurality of bolts of which only one is shown representatively at 46. Numeral 44 is a gear wheel which is mounted on the output shaft 27 and is represented as a transmission input shaft.

In the clutch engaging state as viewed in FIG. 1, the disc facing members 16, 17 and the disc plate 18 are squeezed between the flywheel 11 and the intermediate plate 15, and the disc facing members 19, 21 and the disc plate 20 are squeezed between the intermediate plate 15 and the pressure plate 14.

The operation of the wet-type friction clutch as shown and described is as follows:

When the driver of the vehicle depresses the conventional clutch pedal, not shown, the release bearing 35 is shifted axially leftward from its position shown in FIG. 1 as may be easily understood by any person skilled in the art. For this purpose, the clutch pedal is operatively connected with the release bearing 35, although the necessary motion transmitting means have not been shown as being well. By this leftward sliding movement of the release bearing 35, the extending arms of the diaphragm spring 33 are caused to shift equally leftward by contact thereof with the release bearing 35. Therefore, the diaphragm spring 33 will perform a corresponding swivelling movement about the pivot rings 29, 29 as its center. Thus, the outer ring part of the disphragm spring 33 as shown on the drawing will shift rightward from the position shown in FIG. 1.

In this way, the disc facing members 16, 17 and the disc plate 18, and the disc facing members 19, 21 and the disc plate 20 are released from pressure contact by the pressure plate 14, respectively. Thus, the clutch disc assembly is disengaged. With the rightward displacement of the ring part of the diaphragm spring 33, the pressure plate 14 is forcibly moved rightwards by the action of known retracting springs, not shown. Therefore, a gear shift operation in the transmission gearing can be performed.

With disc facing members 16, 17, 19, 21 being subjected to substantial friction during a substantial service period of the clutch, the cooling oil is directly supplied from the oil passages 40 to the disc facing members 16, 17, 19 21 through the guide portion 48 of the sleeve 39. This cooling is supplied from an oil tank, not shown, by means of a pump, again not shown. The cooling oil from the oil tank is delivered under pressure to the annular groove 41 and then to the oil passages 40. The cross-sectional area of each oil passage 40 is small so that the fluid pressure of the cooling oil is not decreased, therefore the cooling oil flows quickly. The cooling oil passing to the opening end of the oil passages 40 is sprayed by the centrifugal force of the output shaft 27. At this time, as the guide portion 48 of the sleeve 30 is outwardly and inclinedly extended, exact directional qualities are supplied to the sprayed cooling oil which is directly supplied to the disc facing members 16, 17, 19, 21 and these disc facing members 16, 17, 19, 21 are cooled.

Accordingly, by providing the aforedescribed suitable oil passages 40 within the bearing retainer 37, it is possible to direct cooling oil to the disc facing members 16, 17, 19, 21 even when little fluid pressure is employed (about 2 kg/cm). Since directional qualities are supplied to the sprayed cooling oil, it is supplied to the contacting surfaces of the disc facing members 16, 17, 19, 21 and therefore provides effective cooling. Also the cooling oil is constantly supplied to the disc facing members regardless of the releasing direction of the clutch disc assembly so that there is no fear that any retardation will occur in the clutch releasing movement of the clutch disc assembly as noted above.

Obviously many changes and modification of the present invention are possible in light of the foregoing teachings. It is to be understood, therefore, that within the scope of the appended claims, the invention may be practiced otherwise than as specifically described herein.

Accordingly,

What is claimed as new and desire to be secured by Letters Patent of the United States:

1. In a vehicle wet-type friction clutch having a torque transmitting shaft, a disc clutch assembly axially and slidably mounted on said shaft by a spline coupling provided thereon, said disc clutch assembly having friction surfaces, a clutch release bearing having a bearing hub and a fixed bearing retainer for slidably supporting said bearing hub and mounted concentrically about said torque transmitting shaft, the improvement wherein said bearing retainer is provided with at least one axial groove on the inner surface thereof and comprises a sleeve member disposed coaxially within and fixed to said retainer and having an end portion extending toward the clutch beyond the outer end of said retainer to form at least one axial passage with said at least one groove, said end portion being flared outwardly toward said friction surfaces, and means for introducing cooling oil under pressure into the inner end of said at least one passage, the extended outer, flared end portion of said sleeve constituting a guide portion for directing the cooling oil generally radially outwardly toward said friction surfaces as it leaves the at least one passage.

2. The improvement in a wet-type friction clutch as claimed in claim 1 wherein the at least one axial groove provided on the inner surface of said bearing retainer comprises a plurality of circumferentially spaced axial grooves which, with said sleeve, form a plurality of axial passages.

3. The improvement in a wet-type friction clutch as claimed in claim 2 wherein said bearing retainer is further provided with an annular groove at the inner end of the plurality of axial passages for distributing the cooling oil to the plurality of passages.

* * * * *